UNITED STATES PATENT OFFICE.

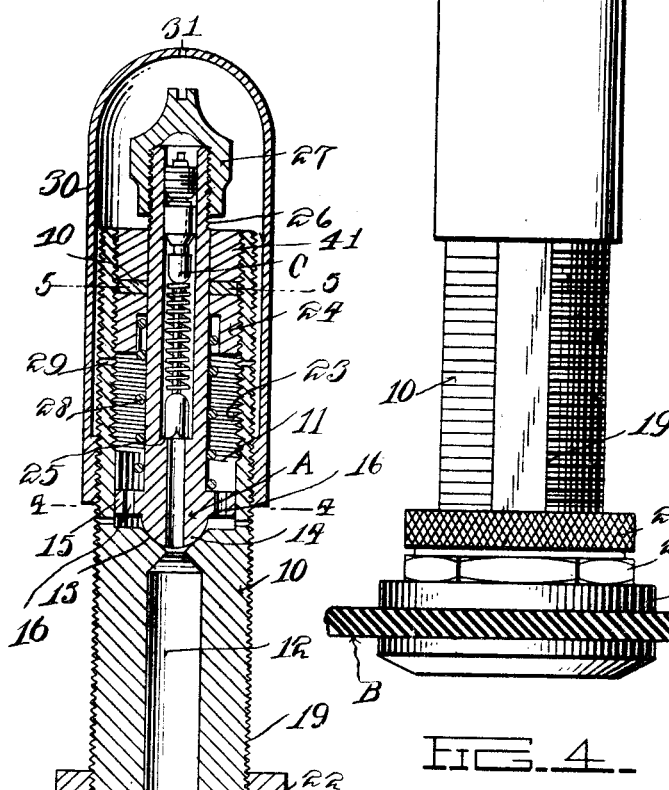

WARREN W. McCREADY AND JOHN G. MYERS, OF PASADENA, CALIFORNIA.

SAFETY-VALVE FOR PNEUMATIC TIRES.

1,068,798.  Specification of Letters Patent.  Patented July 29, 1913.

Application filed October 16, 1912. Serial No. 726,106.

*To all whom it may concern:*

Be it known that we, WARREN W. MC-CREADY and JOHN G. MYERS, citizens of the United States, residing at Pasadena, in the county of Los Angeles, State of California, have invented certain new and useful Improvements in Safety-Valves for Pneumatic Tires; and we do hereby declare the following to be a full, clear, and exact description of the invention, such as will enable others skilled in the art to which it appertains to make and use the same.

This invention relates to safety valves for pneumatic tires.

The object of the invention resides in the provision of a valve of the character named which will serve to automatically relieve the pressure in a pneumatic tire when same has been raised above a predetermined point, and whereby the bursting of the tire as a result of excess pressure therein is prevented.

A further object of the invention resides in the provision of a safety valve for pneumatic tires which may be adjusted so as to operate automatically under the influence of different air pressures within the tire, the adjustment of the valve being controlled by the strength of the tire.

A still further object of the invention resides in the provision of a safety valve for pneumatic tires which will be simple in construction, durable, efficient in operation, easily applied to any type of tire, and which may be manufactured at a comparatively small cost.

With the above and other objects in view the invention consists in the details of construction and in the arrangement and combination of parts to be hereinafter more fully described and particularly pointed out in the appended claim.

In describing the invention in detail reference will be had to the accompanying drawings wherein like characters of reference denote corresponding parts in the several views, and in which—

Figure 1 is a view in elevation of the improved valve, same being shown secured to a part of an automobile tire. Fig. 2 a vertical section of what is shown in Fig. 1. Fig. 3 is a view similar to Fig. 2 showing the parts of the valve in the position they would occupy under the influence of an excess pressure in the tire. Fig. 4 is a section on the line 4—4 of Fig. 2, and Fig. 5 a section on the line 5—5 of Fig. 2.

Referring to the drawings, the valve is shown as comprising a tubular member 10 of any desired material and the bore of which includes an enlarged outer portion 11 and a reduced inner portion 12. Between the enlarged outer portion 11 and reduced inner portion 12 the bore of the member 10 is tapered as at 13 to form a seat for a relief valve A. This relief valve A is also formed of a tubular member of any desired material and of considerably less diameter than the enlarged portion of the bore 11. The inner end of the relief valve A is rounded as at 14 so as to rest snugly upon the seat 13. It will be noted that the seat 13 and end 14 need not be necessarily of the shape disclosed but may be of any desired shape that will enhance the convenience of manufacture. The relief valve A is further provided just inward of the rounded end 14 with a circumscribing flange 15, which latter is provided with air vents 16 and is disposed in spaced relation to the shoulder formed at the inner end of the enlarged portion 11 of the bore of the member 10 when the rounded end 14 of the relief valve A is disposed upon the seat 13. The inner end of the tubular member 10 is provided with a circumscribing flange 17, and is reduced exteriorly inwardly of the flange 17 as at 18. The tubular member 10 is provided between the reduced portion 18 and the outer end thereof with interrupted exterior threads 19.

In applying the valve to a pneumatic tire, indicated at B, the latter is engaged over the flange 17 and clamped to the valve by means of a washer 20 and lock nut 21 while a lock washer 22 clamps against the felly of the wheel, the lock nut 21 and lock washer 22 working on the threads 19. The outer end of the enlarged portion 11 of the bore of the tubular member 10 is threaded as at 23 and engaged with the threads 23 is an adjusting nut 24 through which the relief valve A is adapted to slide. The nut 24 is locked in place by means of a washer 40 and a lock nut 41, it being noted that the interior wall of the washer 40 is provided with opposite flat faces 42 which engage corresponding flat faces of the relief valve A and in this manner the washer 10' is locked against relative rotation of the relief valve. It will be further noted that the washer 40 is provided exteriorly with oppositely disposed projections 43 which engage in grooves 44 formed in the wall of the bore 11 and whereby the washer 40 is locked against relative rotation with respect to the member 10 as is likewise the relief valve A locked against rotation relatively to the member 10. The inner end of the bore of the tubular member of which the relief valve A is formed is reduced so as to produce a shoulder 25 and mounted in the larger portion of the bore of the tubular member of which the relief valve A is formed is a check valve C of the usual and well known construction and through the instrumentality of which air is supplied to the interior of the tire B. The outer end of the tubular member forming part of the check valve C is threaded exteriorly as at 26 and engaged with these threads is a cap 27 whereby leakage of the valve C is provided against. It will be noted that the cap 27 can be screwed upon the outer end of the relief valve A without effecting any rotation of the latter. Encircling the tubular member of which the valve A is formed is a spiral spring 28 one end of which bears against the flange 15 while the other end bears against the nut 24. It will be noted that the flange 15 also serves as a bearing for the valve A during movement of the latter. The tension of this spring 28 may be varied as desired by adjusting the nut 24. The tubular member 10 is provided with a vent 29 disposed between the flange 15 and the nut 24. The outer end of the tubular member 10 is closed by a cap 30 the bore of which at its open end is reduced and threaded and engaged with the threads 19. By thus reducing the bore of the cap 30 the inner portion of said bore will be disposed in spaced relation to the exterior wall of the member 10 so as not to obstruct the passage of air through the vents 29 to the interior of the cap 30. The outer end of the cap 30 is provided with a vent 31 whereby air delivered to the interior of the cap may readily escape to the atmosphere.

In the use of the valve the adjusting nut 24 is positioned so as to impart the desired tension to the spring 28 and air then applied to the interior of the tire in the usual and well known manner. As soon as the pressure of air within the tire becomes excessive as the result of heat or any other cause the relief valve A will be moved outwardly of the tubular member 10 and the rounded end 14 of the relief valve lifted from the seat 13. Air will then pass from the interior of the tire through the vents 16, vents 29 to the interior of the cap 30 and thence through the vent 31 to the atmosphere. In this manner the tire will be relieved of excessive pressure and the bursting of same thereby prevented. As soon as the pressure in the tire is reduced to normal the relief valve A will move inward of the member 10 under the influence of the spring 28 so as to position the rounded end 14 on the seat 13 and thereby prevent further escape of air from the interior of the tire.

What we claim is:—

In a valve structure of the class described, the combination of a tubular member provided with means at one end for connection with a pneumatic tire and having the inner end of its bore reduced to form a relief valve seat and further provided with vents in its wall communicating with the major portion of its bore, a second tubular member slidably arranged in the major portion of the bore of the first-named tubular member and adapted to rest upon said valve seat to close communication between the major and minor portions of the bore of the first-named tubular member, a circumscribing flange on the inner end of the second-named tubular member having its periphery in engagement with the inner wall of the first-named tubular member and provided with air vents connecting portions of the bore on opposite sides of said flange, an adjusting nut threaded in the major portion of the bore of the first-named tubular member and through which the second-named tubular member is adapted to slide, a lock nut threaded in the first-named tubular member outwardly of the adjusting nut, a spring encircling the second-named tubular member and having one end in engagement with said adjusting nut and its other end in engagement with said circumscribing flange whereby the second-named tubular member is held normally engaged against the valve seat of the first-named tubular member, a check valve mounted in the bore of the second-named tubular member, a cap threaded on the outer end of the second-named tubular member, and a cap threaded on the first-named tubular member, said second-named cap having a perforation in its crown and having its side wall spaced from the wall of the first-named tubular member whereby the vents in the wall of the first-named tubular member will connect the interior of the second-named cap and the major portion of the bore of the first-named tubular member.

In testimony whereof, we affix our signatures in presence of two witnesses.

WARREN W. McCREADY.
JOHN G. MYERS.

Witnesses:
W. H. McNELLEY,
H. Z. FABRICK.